Patented Jan. 29, 1952 2,583,681

UNITED STATES PATENT OFFICE 2,583,681

CRYSTAL CONTACTS OF WHICH ONE ELEMENT IS SILICON

Francis Hugh Brittain, Pinner, Charles Eric Ransley, Wembley, and John Walter Ryde, Northwood, England, assignors, by mesne assignments, to Hazeltine Research, Inc., Chicago, Ill., a corporation of Illinois No Drawing. Application August 6, 1947, Serial No. 766,900. In Great Britain April 20, 1945

Section 1, Public Law 690, August 8, 1946
Patent expires April 20, 1965

2 Claims. (Cl. 29—25.3)

This invention relates to crystal contacts of the type used as rectifiers or mixers of electrical oscillations and of which one element is mainly silicon; the other element is usually a metal point; the invention relates more particularly to the manufacture of the silicon element of contacts of this type.

The object of the invention is to provide a method of improving the performance of contacts of the type specified in respect of one or more of the following properties:

(1) *Uniformity.*—This means that the electrical characteristics of the contact should be as nearly as possible independent of the position on the silicon element of a metal point forming the other element of the contact.

(2) *Resistance to voltage breakdown.*—This means that the contact should be capable of withstanding as high a reverse voltage as possible for a given length of time without appreciable deterioration.

(3) *Back to forward impedance ratio.*—This means that the ratio of the higher impedance in one direction (back impedance) to the lower impedance in the other direction (forward impedance) should be as high as possible.

(4) *Sensitivity.*—This means that the signal to noise ratio should be as high as possible.

(5) *Life.*—This means that the efficiency of the contact judged by any of the foregoing criteria should deteriorate as little as possible with age or use.

We have found that this object can be achieved by submitting the contact surface of the silicon element to a process of controlled oxidation to form on the said surface a thin layer having electrical characteristics different from those of the remaining part of the element. Therefore, in accordance with a process according to the present invention, a crystal rectifying device, of which one element is mainly silicon and the other element is a metal point in abutment with a contact surface of the silicon element, has the surface thereof polished and then etched with hydrofluoric acid. The surface is then heated in an oxygen-containing atmosphere so as to produce a layer of oxide on the surface and thereafter the greater part but not all of the oxide layer is removed by etching with hydrofluoric acid so that the remainder of the oxide layer is not thick enough to insulate the metal point from the body of the silicon element.

Thus the manufacture may comprise at least one step of heating the contact surface of the silicon element in an oxygen containing atmosphere so as to produce a layer of oxide on the said surface and thereafter removing some but not all of the said oxide layer, preferably by treating the said surface with an oxide removing agent.

In some cases it may be desirable to have a plurality of such steps of heating each followed by removal of part but not all of the oxide layer.

The said oxide removing agent is preferably hydrofluoric acid.

Preferably the contact surface of the silicon element is polished, and possibly etched, preferably with hydrofluoric acid, before being submitted to the said treatment in accordance with the invention.

In one method of carrying out the invention the contact surface of the silicon element is highly polished by any known method, for example grinding with emery of increasing fineness and finally polishing with alumina or magnesia.

The polished surface is then dipped for five minutes into commercially pure 40% hydrofluoric acid diluted with an equal volume of water.

The silicon element is then placed on a silica tray in a silica tube furnace filled with air and maintained for about two hours at a temperature of about 1050° C.

The element is allowed to cool and the contact surface then again dipped into the aforesaid solution for five minutes.

The silicon element is thereafter mounted and the contact formed in the usual way.

The temperature and duration of the oxide producing heat treatment can be varied over a considerable range and the optimum conditions in any particular case are best determined empirically.

We claim:

1. A method of manufacturing a crystal rectifying device of which one element is mainly silicon and the other element is a metal point in abutment with a surface of the silicon element: said method comprising polishing the contact surface of the silicon element and etching the same with hydrofluoric acid, then heating said element in air at about 1050° C. for about two hours to form a layer of oxide on the contact surface of the silicon element, and, finally, etching the oxidized surface with a solution of forty percent hydrofluoric acid diluted with an equal volume of water for about five minutes to remove the greater part of said oxide layer.

2. A method of manufacturing a crystal rectifying device of which one element is mainly silicon and the other element is a metal point in abutment with a contact surface of the silicon element comprising: polishing said surface, etching said surface with hydrofluoric acid, heating said surface in an oxygen-containing atmosphere so as to produce a layer of oxide on said surface, and thereafter removing the greater part but not all of said oxide layer by etching with hydrofluoric acid so that the remainder of the oxide layer is not thick enough to insulate the metal point from the body of the silicon element.

FRANCIS HUGH BRITTAIN.
CHARLES ERIC RANSLEY.
JOHN WALTER RYDE.

REFERENCES CITED

The following references are of record in the file of this patent:

UNITED STATES PATENTS

| Number | Name | Date |
|---|---|---|
| 756,676 | Midgley | Apr. 5, 1904 |
| 2,402,661 | Ohl | June 25, 1946 |
| 2,402,839 | Ohl | June 25, 1946 |
| 2,469,569 | Ohl | May 10, 1949 |